US009242651B1

(12) United States Patent
Nowak et al.

(10) Patent No.: US 9,242,651 B1
(45) Date of Patent: Jan. 26, 2016

(54) POWER-ON DOWNSHIFT CONTROL OF A DUAL-CLUTCH TRANSMISSION

(71) Applicant: GM GLOBAL TECHNOLOGY OPERATIONS LLC, Detroit, MI (US)

(72) Inventors: Mateusz Nowak, Dearborn, MI (US); Matthew D. Whitton, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/462,811

(22) Filed: Aug. 19, 2014

(51) Int. Cl.
*B60W 10/02* (2006.01)
*B60W 10/06* (2006.01)
*B60W 10/11* (2012.01)
*B60W 30/19* (2012.01)
*F16H 61/04* (2006.01)
*F02D 29/02* (2006.01)
*B60W 10/113* (2012.01)

(52) U.S. Cl.
CPC ............... *B60W 30/19* (2013.01); *B60W 10/06* (2013.01); *B60W 10/113* (2013.01); *F02D 29/02* (2013.01); *F16H 61/0437* (2013.01); *F16H 2061/0462* (2013.01); *F16H 2061/0477* (2013.01); *F16H 2061/0492* (2013.01)

(58) Field of Classification Search
None
See application file for complete search history.

(56) References Cited

U.S. PATENT DOCUMENTS

| 5,577,980 | A | * | 11/1996 | Vukovich | F16H 61/06 477/144 |
| 2006/0089775 | A1 | * | 4/2006 | Whitton et al. | F16H 61/061 701/51 |
| 2006/0178244 | A1 | * | 8/2006 | Whitton et al. | B60W 10/06 477/181 |
| 2014/0032064 | A1 | * | 1/2014 | Thor | B60W 10/02 701/54 |
| 2015/0024905 | A1 | * | 1/2015 | Dunfee, II | B60W 10/113 477/77 |

* cited by examiner

*Primary Examiner* — Edwin A Young
(74) *Attorney, Agent, or Firm* — Quinn Law Group, PLLC

(57) ABSTRACT

A vehicle includes an engine, dual-clutch transmission (DCT), and controller. The controller executes a method to detect a requested power-on downshift of the DCT from an attained gear to a desired gear. Offgoing and oncoming clutches are identified for the power-on downshift from the input clutches, and the controller determines whether engine speed has reached a target synchronous speed. The controller increases oncoming clutch torque at a calibrated ramp rate when a fork for the desired gear has engaged and releases the offgoing clutch at another calibrated ramp rate. If engine flare is present, the controller adjusts the oncoming clutch ramp rate, uses engine torque management to control the flare, and allows the offgoing clutch to continue disengaging. The power-on downshift is completed when the oncoming clutch reaches full torque capacity of the engine and the offgoing clutch is completely exhausted.

17 Claims, 3 Drawing Sheets

POWER-ON DOWNSHIFT CONTROL OF A DUAL-CLUTCH TRANSMISSION

TECHNICAL FIELD

The present disclosure relates to the control of a power-on downshift maneuver in a vehicle having a dual-clutch transmission.

BACKGROUND

A dual-clutch transmission (DCT) combines certain features of manual and automatic transmissions. In a DCT, a first input clutch is applied along with a particular gear fork and synchronizer to engage an oddly-numbered gear of a gearbox, i.e., $1^{st}$ gear, $3^{rd}$ gear, $5^{th}$ gear, etc. A separate second input clutch is applied with a different gear fork and synchronizer to engage an even gear such as $2^{nd}$ gear, $4^{th}$ gear, $6^{th}$ gear, and the like. A transmission control module predicts a desired gear using various available control inputs, for instance engine acceleration and vehicle braking levels. The transmission control module then commands engagement of the particular gear fork used for the desired gear, with gear fork engagement occurring prior to engagement of the input clutch needed for the desired gear. Due to its unique construction, a DCT may provide faster shift speeds relative to those of a conventional automatic transmission, with improved overall shift control and increased post-shift power.

SUMMARY

A system is disclosed herein that includes a dual-clutch transmission (DCT) and a controller. The controller, e.g., a transmission control module, is programmed to control a power-on downshift of the DCT as set forth herein. The controller executes instructions embodying a method. Execution of the instructions causes the controller to decrease the delay that is typically experienced at the end of a conventionally-controlled power-on downshift. The controller allows an offgoing clutch to disengage and uses oncoming clutch management and, if necessary, engine torque management to control engine flare during the power-on downshift. The present method is intended to reduce the amount of time it takes to complete a power-on downshift as well as reduce clutch wear. That is, by releasing the offgoing clutch earlier in a given shift sequence relative to conventional control methods, the total amount of energy absorbed by the offgoing clutch during the power-on downshift is greatly reduced.

In an example embodiment, a vehicle includes an internal combustion engine, a DCT, and a controller. The DCT includes an input member, a pair of input clutches, and separate oddly-numbered and evenly-numbered gear sets. The controller is programmed or otherwise configured to detect a requested power-on downshift of the DCT from an attained gear to a desired gear, for instance a 6-3 power-on downshift, and to identify offgoing and oncoming clutches for the requested power-on downshift from the pair of input clutches.

The controller also determines whether engine speed has reached a target synchronous speed, increases the torque capacity of the oncoming clutch at a calibrated ramp rate when a fork for the desired gear has engaged, and releases the offgoing clutch at the same or another calibrated ramp rate. The controller thereafter adjusts the calibrated ramp rate when engine flare is present to thereby reduce engine flare to a calibrated level. The requested power-on downshift is completed when the oncoming clutch reaches full torque capacity of the engine and the offgoing clutch is completely exhausted.

The controller may be programmed to wait through a calibrated interval after the fork for the oncoming clutch is engaged before releasing the offgoing clutch. The requested power-on downshift may be detected by the controller via processing of the attained gear, a throttle level, a braking level, a vehicle speed, and the desired gear.

The controller may also be programmed to receive the engine speed and the speed of the input member of the DCT, and to calculate the difference in the received speeds to determine if engine flare is present.

During periods of engine flare the controller may automatically limit an increase in engine torque to a maximum engine torque. The increase in torque may be achieved via a torque request from the transmission to an engine control module in some embodiments.

As part of the control methodology, a quick-lock rate may be commanded to rapidly increase oncoming clutch torque only when the synchronous speed has been maintained for a calibrated sync duration. The quick-lock rate may be steeper than the calibrated rate.

A system is also disclosed that includes the DCT and controller noted above.

A method of controlling a power-on downshift in a vehicle having an engine and a DCT includes detecting, via a controller, a requested power-on downshift of the DCT from an attained gear to a desired gear. The method also includes identifying an offgoing clutch and an oncoming clutch for the requested power downshift from among a pair of input clutches of the DCT, and determining whether a speed of the engine has reached a target synchronous speed. Additionally, the method includes increasing clutch torque of the oncoming clutch via the controller at a calibrated ramp rate when a fork for the desired gear has engaged and then releasing the offgoing clutch at another calibrated ramp rate while increasing the clutch torque of the oncoming clutch. The controller adjusts the calibrated ramp rate when engine flare is present to thereby reduce the engine flare to a calibrated level, and then completes the requested power-on downshift when the oncoming clutch reaches full torque capacity of the engine and the offgoing clutch is completely exhausted, thereby transitioning the DCT to the desired gear.

The above features and advantages, and other features and advantages, of the present invention are readily apparent from the following detailed description of some of the best modes and other particular, embodiments for carrying out the invention, as defined in the appended claims, when taken in connection with the accompanying drawings.

DETAILED DESCRIPTION

Figure 1:
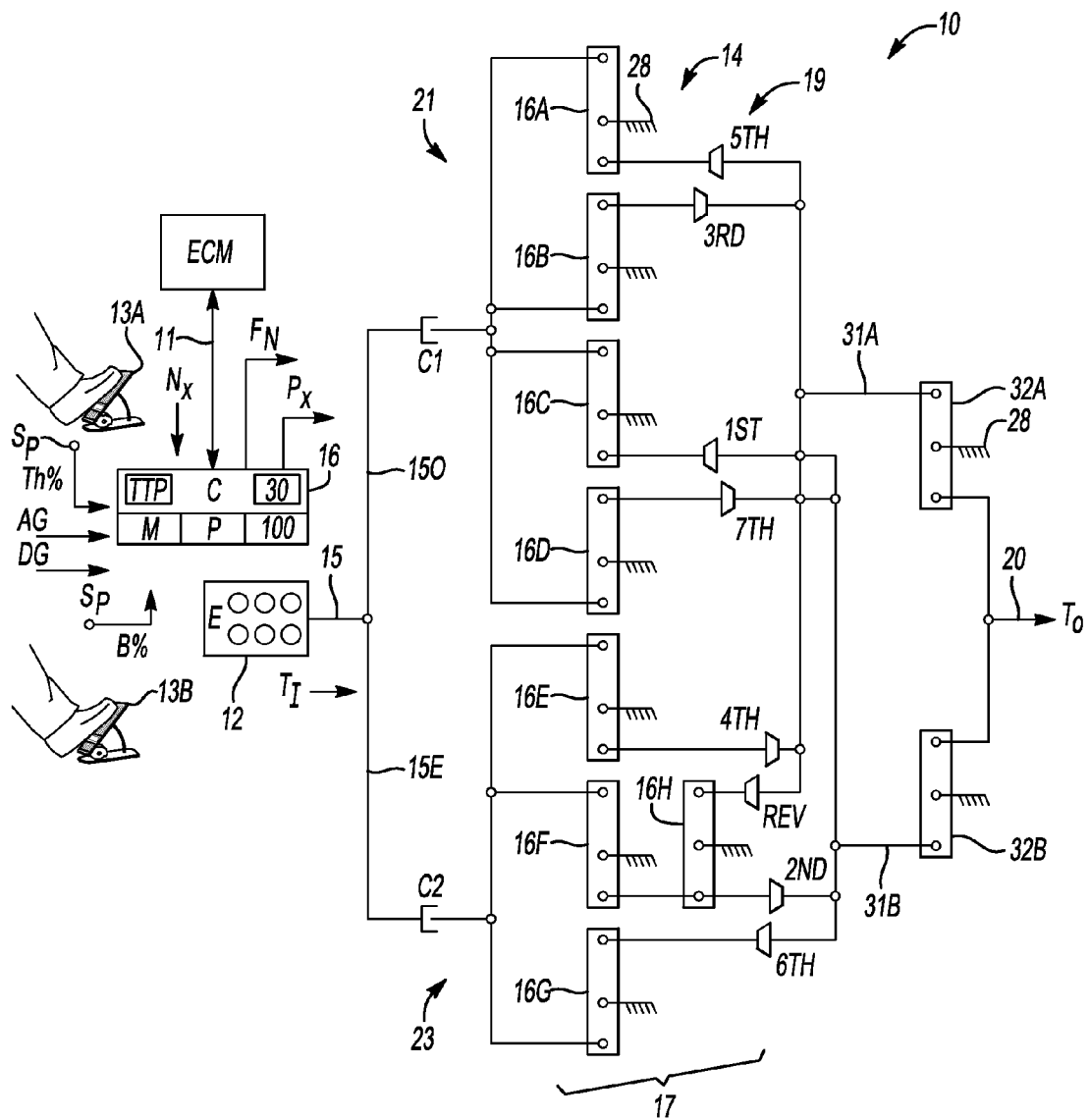
FIG. 1 is a schematic illustration of an example vehicle having a dual-clutch transmission (DCT) and a controller programmed to control a power downshift shift of the DCT as set forth herein.

Referring to the drawings, wherein like reference numbers refer to like components throughout the several Figures, an example vehicle 10 is shown schematically in FIG. 1. The vehicle 10 includes an internal combustion engine (E) 12 and a dual-clutch transmission (DCT) 14. The engine 12 is responsive to a received throttle request (arrow Th %), e.g., an apply force or a corresponding percentage of travel of an accelerator pedal 13A or another suitable throttle input device, with the throttle request (arrow Th %) requesting a relative level of input torque (arrow $T_I$) from the engine 12. The force/travel of the accelerator pedal 13A may be detected via a force or position sensor ($S_P$) in the conventional manner. The engine 12 may also respond to a braking level (arrow B %) from a brake pedal 13B, with the braking level (arrow B %) likewise detected via a force or position sensor ($S_P$). In response to receipt of the throttle request (arrow Th %) by a controller (C) 16, or by an engine control module (ECM) if the controller 16 is configured as a transmission control module, the engine 12 delivers the input torque (arrow $T_I$) to the DCT 14 via an input member 15.

As explained below with reference to FIGS. 2 and 3, the controller 16 is configured, i.e., specially programmed in software and equipped in hardware, to control a power-on downshift of the DCT 14 in a manner that decreases delays experienced at the end of the power-on downshift. As used herein, the term "power-on downshift" refers to a shift of the DCT 14 from a higher gear to a lower gear while a driver is applying the accelerator pedal 13A. The method 100 of FIG. 3, as illustrated via the time plots of FIG. 2, helps to ensure that power-on downshifts occur quickly and smoothly relative to conventional approaches, such as those that hold torque via an offgoing clutch until engine flare and other issues resolve themselves.

The example DCT 14 of FIG. 1 may include a gearbox 17 and two independently-operated, non-lubricated input clutches C1 and C2. While omitted from FIG. 1 for illustrative clarity, each input clutch C1 and C2 may include a center plate containing spaced friction discs, plates, or other suitable friction devices. The input clutches C1 and C2 are selectively compressed together via a fluid-actuated clutch piston or other suitable clutch actuator(s) (not shown), with these pistons having an axial position that is used in the overall control of the input clutches C1 and C2. Associated electronic and hydraulic clutch control devices (not shown) ultimately control the shift operations of the DCT 14, including power-on downshifts as noted above, in response to instructions or commands from the controller 16.

In the example DCT 14, the input clutch C1 may be used to connect the engine 12 to any of the oddly-numbered gear sets 16A, 16B, 16C, and 16D, via an odd shaft 15O, with each gear set having a node connected to a stationary member 28 of the DCT 14, for instance to establish respective fifth ($5^{th}$), third ($3^{rd}$), first ($1^{st}$), and seventh ($7^{th}$) gears in the example 7-speed transmission design of FIG. 1. The input clutch C2 connects the engine 12 to the respective evenly-numbered gear sets 16E, 16F, and 16G via an even shaft 15E, e.g., fourth ($4^{th}$), second ($2^{nd}$), and sixth ($6^{th}$) gears in the same example 7-speed transmission, as well as to a reverse gear set 16H. Clutch forks and synchronizers 19 are shown schematically for the various gear sets, with engagement of a given fork commanded by the controller 16 via fork control signals (arrow $F_N$). Using this type of gear arrangement, the DCT 14 can be rapidly shifted through its available range of gears without completely interrupting the power flow from the engine 12.

In the example vehicle 10 of FIG. 1, the DCT 14 also includes an output member 20 that is connected to a set of drive wheels (not shown). The output member 20 ultimately transmits output torque (arrow $T_O$) from the DCT 14 to the drive wheels in order to propel the vehicle 10. The DCT 14 includes a first input shaft 21 that is connected to the output side of input clutch C1, and also a second input shaft 23 that is connected to the output side of input clutch C2. The first input shaft 21 is connected to only the oddly-numbered gear sets 16A, 16B, 16C, and 16D. Likewise, the second input shaft 23 is connected to only the evenly-numbered gear sets 16E, 16F, and 16G and the reverse gear set 16H. The DCT 14 further includes upper and lower main shafts 31A and 31B, respectively, which may be connected to respective final drive gear sets 32A and 32B. The final drive gear sets 32A and 32B provide any required final gear reduction.

The controller 16 of FIG. 1 may be embodied as a microprocessor-based computing device or devices having a processor (P) and memory (M), including but not necessarily limited to magnetic or optical read only memory (ROM), random access memory (RAM), electrically-erasable programmable read-only memory (EEPROM), flash memory, etc., and any required circuitry. The circuitry may include high-speed clocks, a counter or timer 30, analog-to-digital (A/D) circuitry, digital-to-analog (D/A) circuitry, a digital signal processor, transceivers configured to transmit and receive any required signals during the overall control of the DCT 14, and the necessary input/output (I/O) devices and other signal conditioning and/or buffer circuitry. The controller 16 may be in communication with the ECM via control signals (double-headed arrow 11) in some embodiments, e.g., to request speed control of the engine 12 as noted below with reference to FIG. 3.

The controller 16 of FIG. 1 processes various driver inputs such as the throttle level (arrow Th %), braking level (arrow B %), vehicle speed (arrow Nx), the attained gear (arrow AG), i.e., the gear state the DCT 14 is currently in, and the desired gear (arrow DG) to be attained upon completion of the power-on downshift. The controller 16 ultimately outputs a clutch position control signal (arrow Px) to the designated input clutch C1 or C2 for a given shift to set the position of the designated input clutch C1 or C2. Thus, the input clutches C1 and C2 are "position-controlled" clutches. In other words, the clutch position control signal (arrow Px) sets the axial or linear position of a clutch apply piston or other actuator device of the input clutch C1 or C2 for applying the input clutch C1 or C2, whichever one acts as the oncoming clutch during a requested shift. A torque-to-position table (TTP) may be recorded in memory M of the controller 16 and used to determine the corresponding position for a required clutch torque, as is well known in the art.

Figure 2:
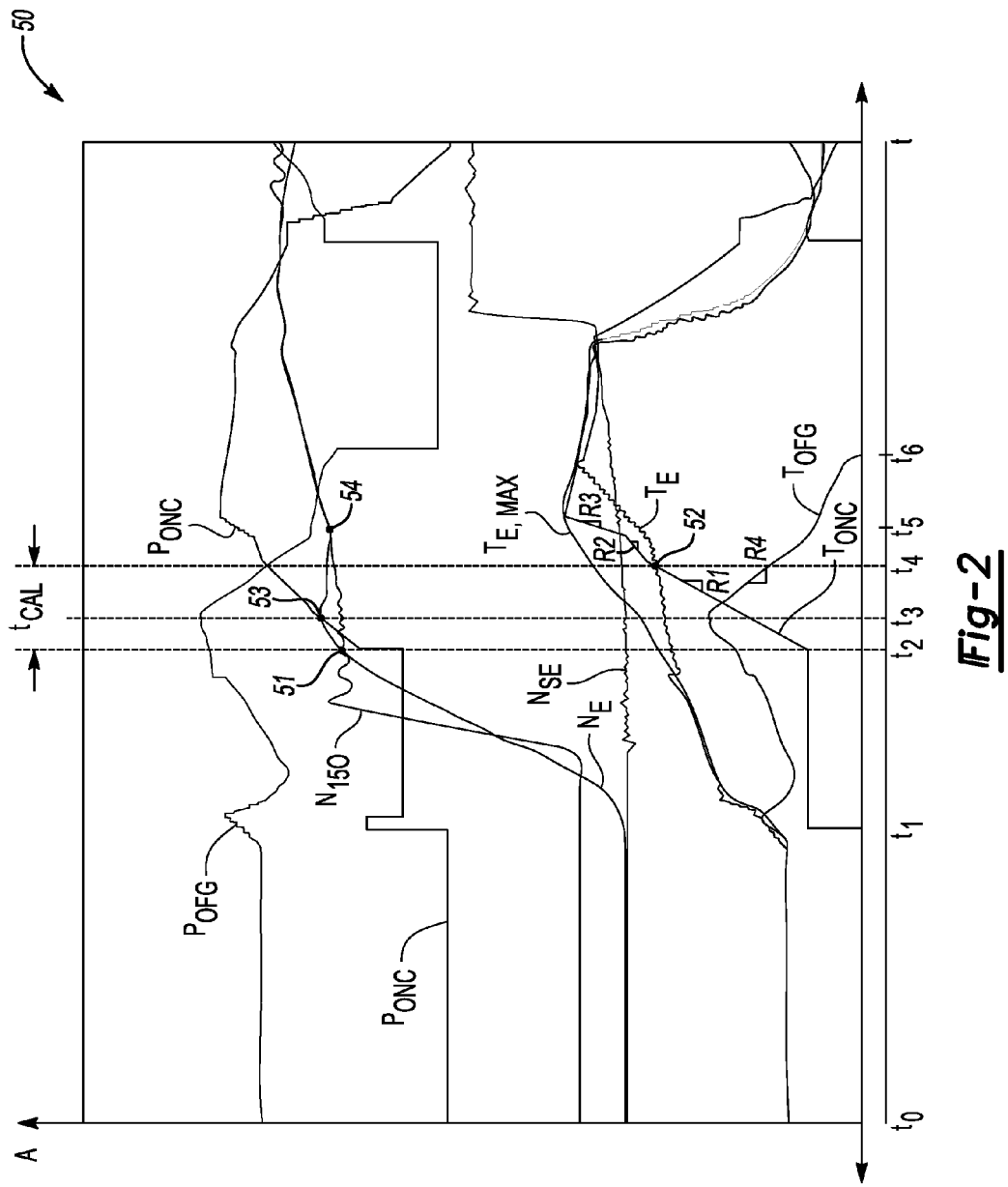
FIG. 2 is a set of example powertrain parameters usable by the controller of FIG. 1 in controlling a power downshift.
Figure 3:
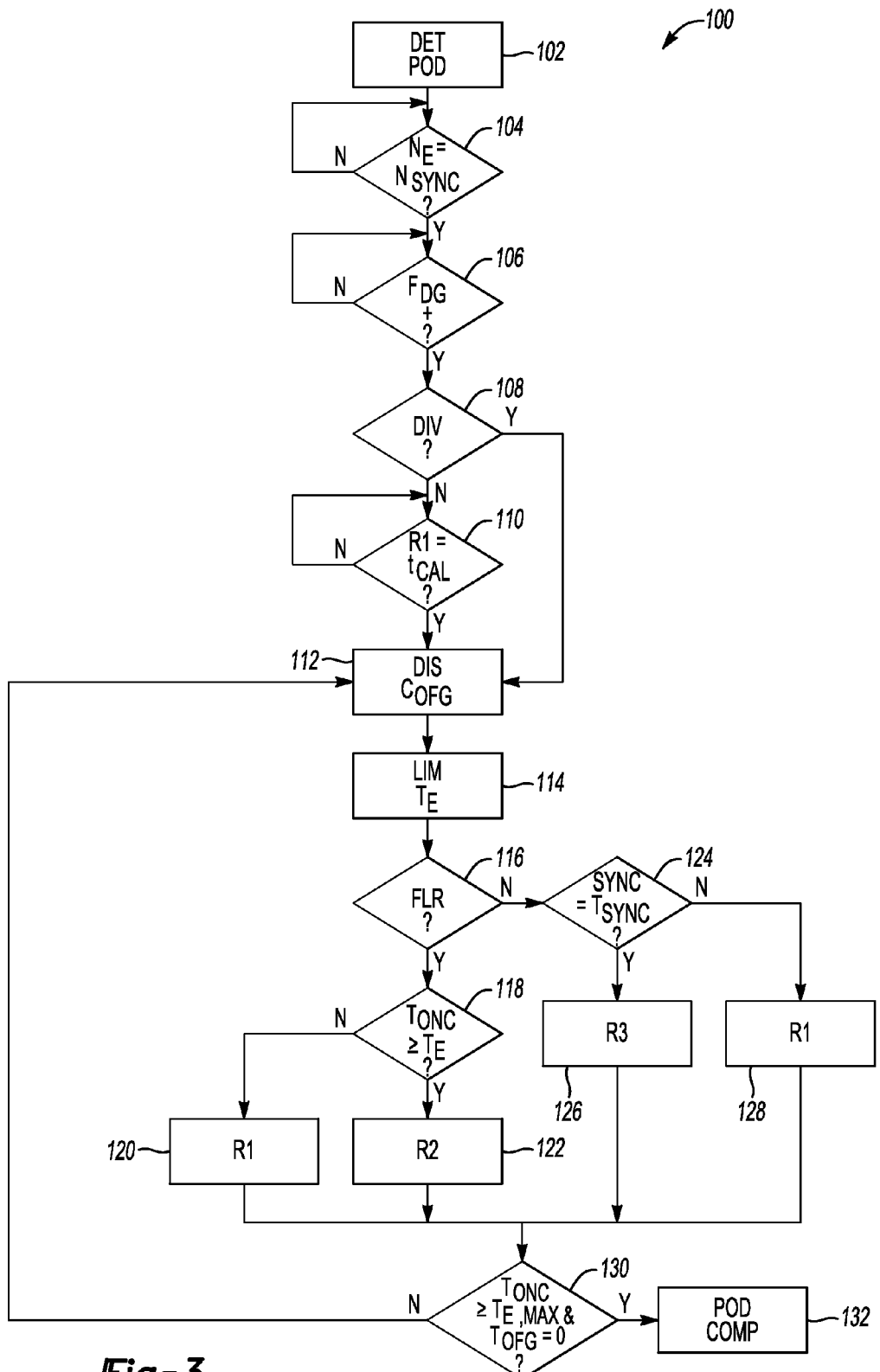
FIG. 3 is a schematic logic flow chart describing an example embodiment of a power downshift shift of the DCT shown in FIG. 1.

Referring to FIG. 3 in conjunction with a representative set of traces 50 of FIG. 2, an example embodiment of the method 100 begins with step 102, wherein the controller 16 detects a requested power-on downshift (DET POD) of the DCT 14 of FIG. 1. This event occurs at $t_1$ in FIG. 2. Step 102 may entail processing the attained gear (arrow AG), the throttle level (arrow Th %), the braking level (arrow B %), the vehicle speed (arrow Nx), the desired gear (arrow DG), and/or other speed values such as transmission input speed and output speed, for instance as measured by input and output speed sensors (not shown), respectively. The method 100 proceeds to step 104 when a requested power downshift is detected.

At step 104, the controller 16 next determines whether a speed of the engine 12, i.e., trace $N_E$ in FIG. 2, with a corresponding engine torque trace ($T_E$), has reached a target synchronous (sync) speed. This occurs at point 51 in FIG. 2. Step 104 is repeated until the engine speed ($N_E$) has reached the target synchronous speed ($N_{SYNC}$), i.e., when $N_E = N_{SYNC}$. The target synchronous speed in this example shift is the speed of the odd shaft 15O at and after reaching point 51. At this point, the method 100 proceeds to step 106.

Step 106 entails verifying that a clutch fork and synchronizer 19 used for selecting the desired gear has engaged. For example, a sensor (not shown) positioned on or adjacent to the clutch fork and synchronizer 19 used for the desired gear can measure the position of the particular fork for that synchronizer. As is well known in the art, a clutch fork in a DCT has a known or calibrated "engaged" position, and therefore the controller 16 may receive and process position signals from such a sensor and compare the measured position to the calibrated engaged position. The controller 16 may also look to the rotational speed of the input member 15 used for the power downshift, for instance the odd shaft 15O for an example 6-3 power-on downshift, which should equal the transmission output speed multiplied by a known gear ratio when the fork is fully engaged. The method 100 proceeds to step 108 when the controller 16 has verified that the fork for the oncoming clutch is engaged, and otherwise repeats step 106.

At step 108, the controller 16 determines if divergence (DIV) is present between engine speed (trace $N_E$) and the input shaft speed, i.e., a rotational speed of the odd shaft 15O or the even shaft 15E used for the power-on downshift. Shaft speed is indicated as trace $N_{15O}$ in FIG. 2 for an example 6-3 power-on downshift. As is well known in the art, the term "divergence" refers to a condition in which engine speed (trace $N_E$) drops below input shaft speed, while the opposite condition is described as "flare". An engine flare condition is shown in FIG. 2 between points 51 and 54. If divergence is detected at step 108, the method 100 of FIG. 3 proceeds to step 112 without correcting the divergence. The method 100 proceeds to step 110 if divergence is not detected.

Step 110 includes increasing oncoming clutch torque, trace $T_{ONC}$ of FIG. 2, at a first calibrated ramp rate (R1) for a calibrated duration ($t_{CAL}$), with $t_{CAL}$ in FIG. 2 being the duration between t2 and t3. The method 100 proceeds to step 112 once the calibrated duration for the first calibrated ramp rate (R1) is complete.

Step 112 includes disengaging the offgoing clutch (DIS $C_{OFG}$) at another calibrated rate R4, which may be the same as ramp rate R1 of steps 120 and 128 discussed below or a different calibrated rate. Offgoing torque is shown in FIG. 2 as trace $T_{OFG}$, with the corresponding position command ($P_{OFG}$) also shown, with both decreasing beginning at about t3. The method 100 proceeds to step 114 as step 112 is ongoing.

Step 114 includes sending an engine torque request by the controller 16 of FIG. 1 to the ECM via control signals (double-headed arrow 11), such that the rise in engine torque (trace $T_E$ of FIG. 2) is limited and the actual engine torque does not exceed a maximum value. Such a step is abbreviated as "LIM $T_E$" in FIG. 3. The result of step 114 is to prevent engine flares or to ensure that any existing engine flare is held relatively constant. The method 100 then proceeds to step 116.

At step 116, the controller 16 of FIG. 1 processes engine speed and input shaft speed, e.g., traces $N_E$ and $N_{15O}$ of FIG. 2, to determine if engine flare (FLR) is present. The method 100 proceeds to step 118 when engine flare is present, as it is between points 51 and 53 of FIG. 2 when engine speed (trace $N_E$) exceeds the shaft speed ($N_{15O}$), and to step 124 in the alternative when engine flare is not present.

At step 118, the controller 16 determines whether the oncoming clutch torque (trace $T_{ONC}$ of FIG. 2) has reached the level of engine torque (trace $T_E$). Engine torque (trace $T_E$) is an actual amount of engine torque as known by the controller 16, e.g., reported engine torque from the ECM, or as determined by the controller 16 itself when a unitary controller is used. As is known in the art, engine torque is usually not typically directly measured but rather calculated as part of the existing functionality of an ECM. The method 100 proceeds to step 120 if reported engine torque is less than reported engine torque, i.e., if $T_{ONC} < T_E$. Otherwise, the method 100 proceeds to step 122.

Step 120 includes ramping torque capacity of the oncoming clutch ($T_{ONC}$) at the rate, R1, which is calibrated to be similar to the rate at which torque capacity of the offgoing clutch is ramped off. As this calibrated torque handoff continues, the method 100 proceeds to step 130.

Step 122 includes modifying the oncoming ramp rate R1 into a second calibrated ramp rate (R2), as shown between $t_4$ and $t_5$ in FIG. 2, to smoothly reduce the engine flare. As ramp rate R2 is applied, the method 100 proceeds to step 130.

Step 124 includes determining whether a synchronous speed (SYNC) has been maintained between engine speed ($N_E$) and input shaft speed ($N_{15O}$) for a calibrated sync duration ($t_{SYNC}$), i.e., if SYNC=$t_{SYNC}$. Synchronous speed is achieved at point 54 in FIG. 2, and therefore step 124 may entail starting a timer of the controller 16 at point 54 and determining if the timer value reaches the calibrated sync duration ($t_{SYNC}$). The controller transitions to step 128 if sync has not been maintained for the calibrated sync duration, and to step 126 when the calibrated sync duration has completed.

At step 126, the method 100 includes rapidly increasing the oncoming clutch ramp rate, i.e., R1, to a faster "quick-lock" rate (R3). This commences in FIG. 2 at about $t_5$, and is held until about $t_6$. The method 100 then proceeds to step 130.

At step 130 the controller 16 determines if the oncoming clutch torque ($T_{ONC}$) is equal to or greater than the maximum torque that the engine can produce for a given throttle level ($T_{E,MAX}$) and if the offgoing clutch torque ($T_{OFG}$) is less than zero. If both of those conditions are met the method proceeds to step 132. Otherwise, the method returns to step 112 and continues to disengage the off-going clutch.

At step 132, the controller 16 completes the requested power-on downshift when the oncoming clutch reaches full torque capacity of the engine 12 and the offgoing clutch is completely exhausted.

the controller 16 completes the power downshift (POD COMP) that was originally requested at step 102. The offgoing clutch is completely exhausted, and the oncoming clutch is at full torque capacity of the engine.

The detailed description and the drawings or figures are supportive and descriptive of the invention, but the scope of the invention is defined solely by the claims. While the best mode, if known, and other embodiments for carrying out the claimed invention have been described in detail, various alternative designs and embodiments exist for practicing the invention defined in the appended claims.

The invention claimed is:

1. A vehicle comprising:
an engine having an engine speed;
a dual-clutch transmission (DCT) having an input member, a pair of input clutches, and separate oddly-numbered and evenly-numbered gear sets, wherein an application of a designated one of the pair of input clutches connects the engine to a corresponding one of the oddly-numbered or evenly-numbered gear sets; and
a controller in communication with the pair of input clutches, wherein the controller includes a processor and tangible, non-transitory memory, and wherein the controller is configured to:
detect a requested power-on downshift of the DCT from an attained gear to a desired gear;
identify an offgoing clutch and an oncoming clutch for the requested power downshift from among the pair of input clutches;

determine whether the engine speed has reached a target synchronous speed;

increase clutch torque of the oncoming clutch at a calibrated ramp rate when a fork for the desired gear has engaged;

release the offgoing clutch at the calibrated ramp rate while increasing the clutch torque of the oncoming clutch at the calibrated ramp rate;

adjust the calibrated ramp rate when engine flare is present to thereby reduce the engine flare to a calibrated level; and complete the requested power-on downshift when the oncoming clutch reaches full torque capacity of the engine and the offgoing clutch is completely exhausted.

2. The vehicle of claim 1, wherein the controller is programmed to wait through a calibrated interval after the fork for the oncoming clutch is engaged before releasing the offgoing clutch.

3. The vehicle of claim 1, wherein the controller is programmed to detect the requested power-on downshift by processing the attained gear, a throttle level, a braking level, a vehicle speed, and the desired gear.

4. The vehicle of claim 1, wherein the controller is programmed to receive the engine speed and a speed of the input member of the DCT, and to calculate the difference to determine if the engine flare is present.

5. The vehicle of claim 1, wherein the controller is further programmed to limit an increase in torque from the engine to a maximum engine torque during the engine flare.

6. The vehicle of claim 5, wherein the vehicle includes an engine control module, and wherein the controller is programmed to limit the increase in torque from the engine via a torque request from the transmission to the engine control module.

7. The vehicle of claim 1, wherein the controller is programmed to execute a quick-lock rate to rapidly increase the clutch torque of the oncoming clutch only when the synchronous speed has been maintained for a calibrated sync duration.

8. A system comprising:

a dual-clutch transmission (DCT) having an input member, a pair of input clutches, and separate oddly-numbered and evenly-numbered gear sets; and a controller in communication with the pair of input clutches, wherein the controller includes a processor and tangible, non-transitory memory, wherein the controller is configured to:

detect a requested power-on downshift of the DCT from an attained gear to a desired gear;

identify an offgoing clutch and an oncoming clutch for the requested power downshift from among the pair of input clutches;

determine whether a speed of an engine has reached a target synchronous speed;

increase clutch torque of the oncoming clutch at a calibrated ramp rate when a fork for the desired gear has engaged;

release the offgoing clutch at the calibrated ramp rate while increasing the clutch torque of the oncoming clutch at the calibrated ramp rate;

adjust the calibrated ramp rate when engine flare is present to thereby reduce the engine flare to a calibrated level; and complete the requested power-on downshift when the oncoming clutch reaches full torque capacity of the engine and the offgoing clutch is completely exhausted.

9. The system of claim 8, wherein the controller is programmed to wait through a calibrated interval after the fork for the oncoming clutch is engaged before releasing the offgoing clutch.

10. The system of claim 8, wherein the controller is programmed to detect the requested power-on downshift by processing the attained gear, a throttle level, a braking level, a vehicle speed, and the desired gear.

11. The system of claim 8, wherein the controller is programmed to receive the engine speed and a speed of the input member of the DCT, and to calculate the difference to determine if the engine flare is present.

12. The system of claim 8, wherein the controller is further programmed to limit an increase in torque from the engine to a maximum engine torque during the engine flare.

13. The system of claim 12, wherein the controller is programmed to limit the increase in torque from the engine via a request for torque control of the engine.

14. The system of claim 8, wherein the controller is programmed to execute a quick-lock rate to rapidly increase the clutch torque of the oncoming clutch only when the synchronous speed has been maintained for a calibrated sync duration.

15. A method of controlling a power-on downshift in a vehicle having an engine and a dual-clutch transmission (DCT), the method comprising:

detecting, via a controller, a requested power-on downshift of the DCT from an attained gear to a desired gear;

identifying an offgoing clutch and an oncoming clutch for the requested power downshift from among a pair of input clutches of the DCT;

determining whether a speed of the engine has reached a target synchronous speed;

increasing clutch torque of the oncoming clutch via the controller at a calibrated ramp rate when a fork for the desired gear has engaged;

releasing the offgoing clutch at the calibrated ramp rate while increasing the clutch torque of the oncoming clutch at the calibrated ramp rate;

adjusting the calibrated ramp rate when engine flare is present to thereby reduce the engine flare to a calibrated level; and completing the requested power-on downshift when the oncoming clutch reaches full torque capacity of the engine and the offgoing clutch is completely exhausted, thereby transitioning the DCT to the desired gear.

16. The method of claim 15, further comprising waiting through a calibrated interval after the fork for the oncoming clutch is engaged before releasing the offgoing clutch.

17. The method of claim 15, further comprising limiting an increase in torque from the engine to a maximum engine torque during the engine flare.

* * * * *